Feb. 21, 1950 — R. BURLEY — 2,497,976
REVERSIBLE COOKING UTENSIL
Filed Sept. 20, 1946
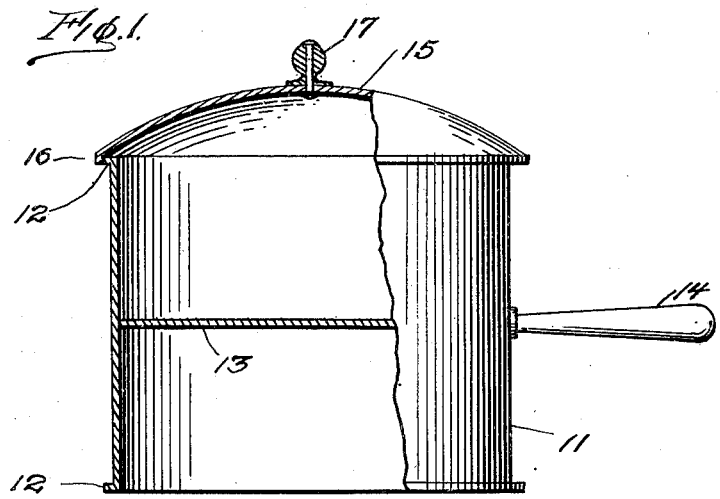
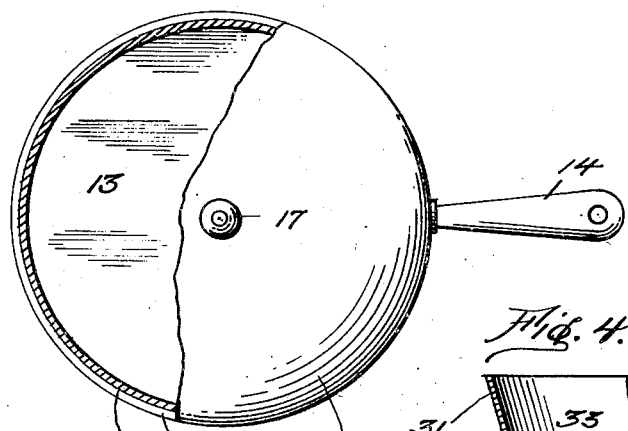
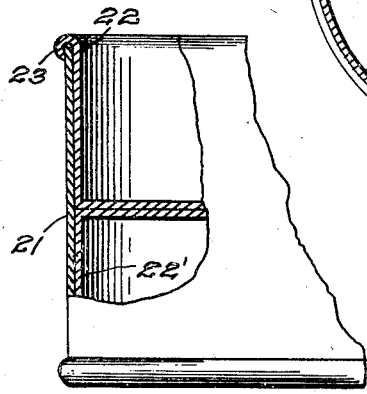
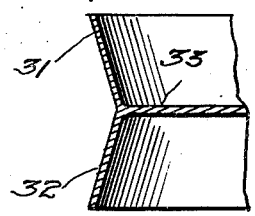
Inventor
ROL BURLEY

Patented Feb. 21, 1950

2,497,976

UNITED STATES PATENT OFFICE 2,497,976

REVERSIBLE COOKING UTENSIL

Rol Burley, St. Paris, Ohio

Application September 20, 1946, Serial No. 698,310

1 Claim. (Cl. 126—376)

This invention relates to cooking utensils, and more particularly to utensils employed over flame burners, such as gas burners.

A main object of the invention is to provide a novel and improved cooking utensil which is very simple in construction and which provides efficient heat distribution over its cooking surface.

A further object of the invention is to provide an improved cooking utensil which is inexpensive to manufacture, neat in appearance and economical to use, said utensil being constructed so as to provide a substantially uniform cooking temperature over its cooking surface and avoiding scorching of food due to localized heating as is now frequently experienced with conventional utensils employed over flame burners.

Further objects and advantages of the invention will become apparent from the following description and claim, and from the accompanying drawings, wherein:

Figure 1 is a side elevational view, partly in cross-section, of a cooking utensil constructed in accordance with the present invention.

Figure 2 is a top plan view, partly in cross-section, of the cooking utensil of Figure 1.

Figure 3 is a fragmentary side elevational view, partly in cross section, illustrating a modification of the present invention.

Figure 4 is a fragmentary sectional view illustrating a further modification of the present invention.

Referring to the drawings, 11 designates the body portion of a utensil constructed in accordance with the invention, said body portion being generally cylindrical in contour and having top and bottom outwardly directed annular flanges 12, 12. Preferably integral with body portion 11 is an internal horizontal partition 13 midway between the top and bottom of said body portion. Secured to the outside of body portion 11 at the same level as partition 13 is a horizontal outwardly projecting handle 14. A crowned lid 15 is provided having a depending rim 16 adapted to fit over the annular flange 12 at either the top or bottom of the body portion 11, so that the utensil may be used in either of two positions. Lid 15 is provided at its center with a knob 17 of heat insulating material.

In cooking food, the food is placed in the upper compartment of the utensil and the lower compartment is positioned over a flame burner, such as a gas burner. Since partition 13 is spaced a substantial distance above the burner, direct contact of the flame therewith is avoided, which prevents local areas of the cooking surface from being heated to excessively high temperatures. Heat is applied to the cooking surface by radiation and convection in the lower compartment so that the temperature gradient over the partition 13 is substantially uniform and the food is cooked without local scorching. In this manner the food is properly cooked and efficient utilization of the heat from the burner is obtained.

Figure 3 illustrates a modification of the invention wherein the body portion of the container comprises an outer cylindrical shell 21. Telescoped into the upper portion of shell 21 is a removable container 22 having a curved top flange 23 which receives the top rim of shell 21. An identical container 22' is telescoped into the lower portion of shell 21 in inverted position. The bottom walls of containers 22 and 22' are in abutment to provide efficient heat transmission therethrough. If desired, the bottom container 22' may be omitted.

In the embodiment of Figure 4, the utensil has a flared top portion 31 and a reversely flared bottom portion 32 identical in size to top portion 31. A horizontal partition wall 33 midway between the top and bottom of the utensil forms a common wall between top portion 31 and bottom portion 32. As in the embodiments of Figures 1 and 3, the utensil may be employed either in the upright or the inverted position.

In both of the embodiments of Figures 3 and 4, a horizontally projecting handle such as handle 14 is secured to the outside of the utensil at the mid-portion thereof.

While certain specific embodiments of a cooking utensil have been disclosed in the foregoing description, it will be understood that various modifications within the spirit of the invention may occur to those skilled in the art. Therefore it is intended that no limitations be placed on the invention other than as defined by the scope of the appended claim.

What is claimed is:

In a cooking utensil comprising a cylindrical shell disposed upright and having both ends open, a first container telescopically disposed in one end of the cylindrical shell, and a curved outwardly projecting top flange on the container serving to receive the upper edge of said cylindrical shell, the features which include a flat wall in said container disposed substantially midway between the ends of said shell, a second container telescopically disposed in the other end of said shell in inverted position, a curved outwardly projecting bottom flange on the second container serving to receive the lower edge of said shell, and a flat wall upon said second container disposed substantially midway between the ends of said shell and being in coextensive contact with the bottom of said first container, both containers being similar, substantially equal in form and dimensions and individually usable according to which end of the shell is uppermost.

ROL BURLEY.

REFERENCES CITED

The following references are of record in the file of this patent:

UNITED STATES PATENTS

| Number | Name | Date |
|---|---|---|
| 403,279 | Manning | May 14, 1889 |
| 777,815 | Stewart | Dec. 20, 1904 |
| 884,767 | Senseney | Apr. 14, 1908 |
| 1,324,297 | Braddick | Dec. 9, 1919 |
| 1,680,882 | Hollen | Aug. 14, 1928 |
| 2,329,375 | Houlihan | Sept. 14, 1943 |